No. 702,576. Patented June 17, 1902.
W. J. MEIKLEHAM.
CUP CAKE DROPPING APPARATUS.
(Application filed June 18, 1901.)
(No Model.) 2 Sheets—Sheet 1.

WITNESSES:  
INVENTOR.  
W. J. Meikleham.  
ATTORNEY.

No. 702,576. Patented June 17, 1902.
W. J. MEIKLEHAM.
CUP CAKE DROPPING APPARATUS.
(Application filed June 18, 1901.)
(No Model.) 2 Sheets—Sheet 2.

WITNESSES:
INVENTOR.
W. J. Meikleham.
BY
ATTORNEY.

UNITED STATES PATENT OFFICE.

WILLIAM J. MEIKLEHAM, OF DENVER, COLORADO.

CUP-CAKE-DROPPING APPARATUS.

SPECIFICATION forming part of Letters Patent No. 702,576, dated June 17, 1902.

Application filed June 18, 1901. Serial No. 65,042. (No model.)

*To all whom it may concern:*

Be it known that I, WILLIAM J. MEIKLEHAM, a citizen of the United States of America, residing at Denver, in the county of Arapahoe and State of Colorado, have invented certain new and useful Improvements in Cup-Cake-Dropping Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in apparatus for measuring and ejecting or dropping dough into the cells or receptacles of cup-cake pans, my object being to secure practical uniformity in the amount of dough deposited in each cell and also to make it practicable to use thin dough, whereby the cakes when baked are light and spongy. The aforesaid results are impossible when the dough is formed by hand, as is the usual custom preparatory to placing it in the pans for baking.

My improved apparatus for accomplishing the aforesaid objects consists of the features, arrangements, and combinations hereinafter described and claimed, all of which will be fully understood by reference to the accompanying drawings, in which is illustrated an embodiment of the invention.

Figure 1:
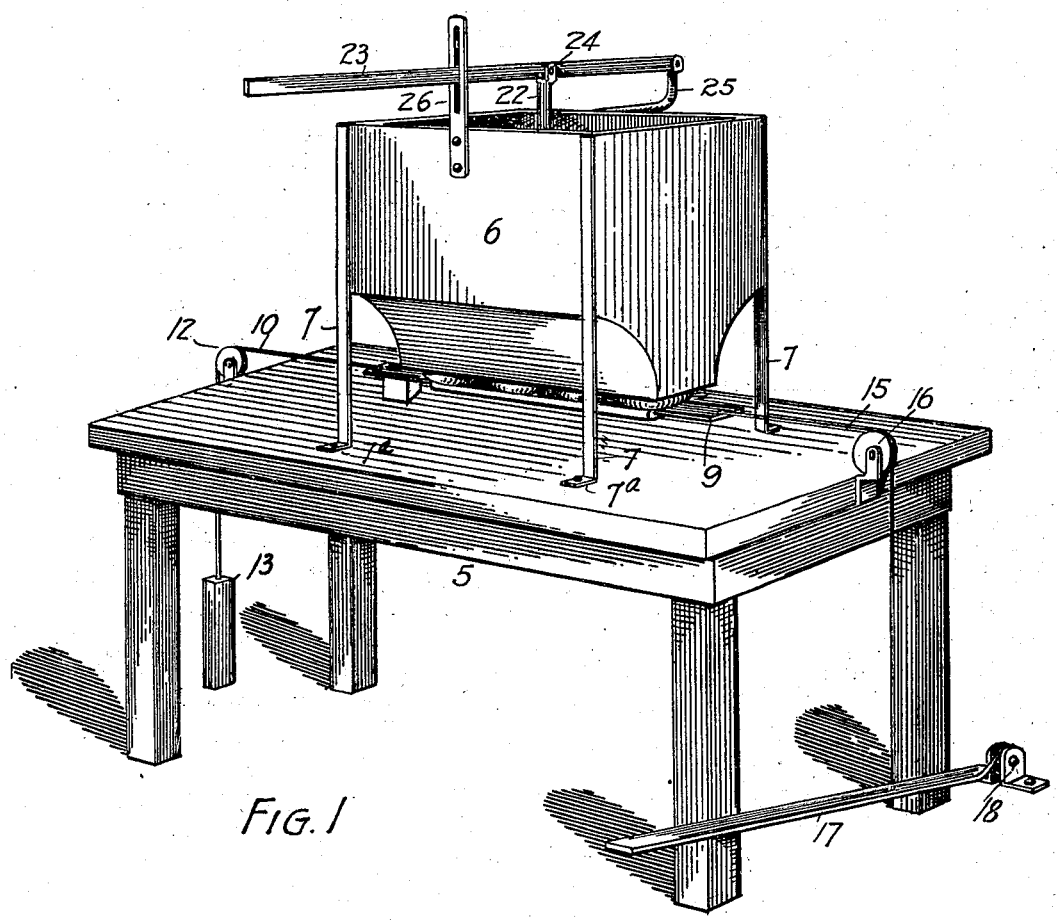
Figure 2:
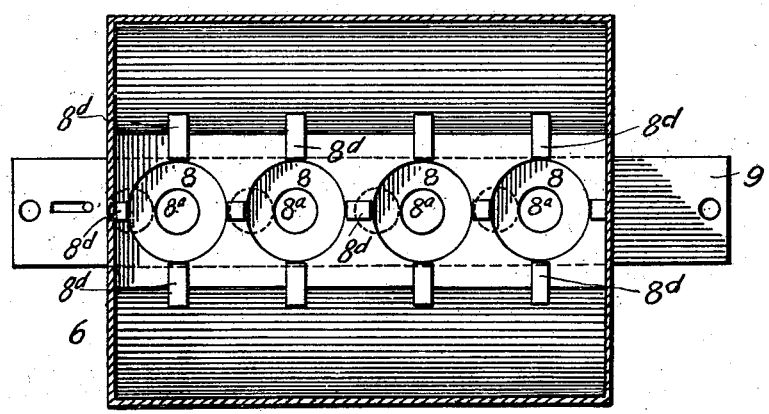
Figure 3:
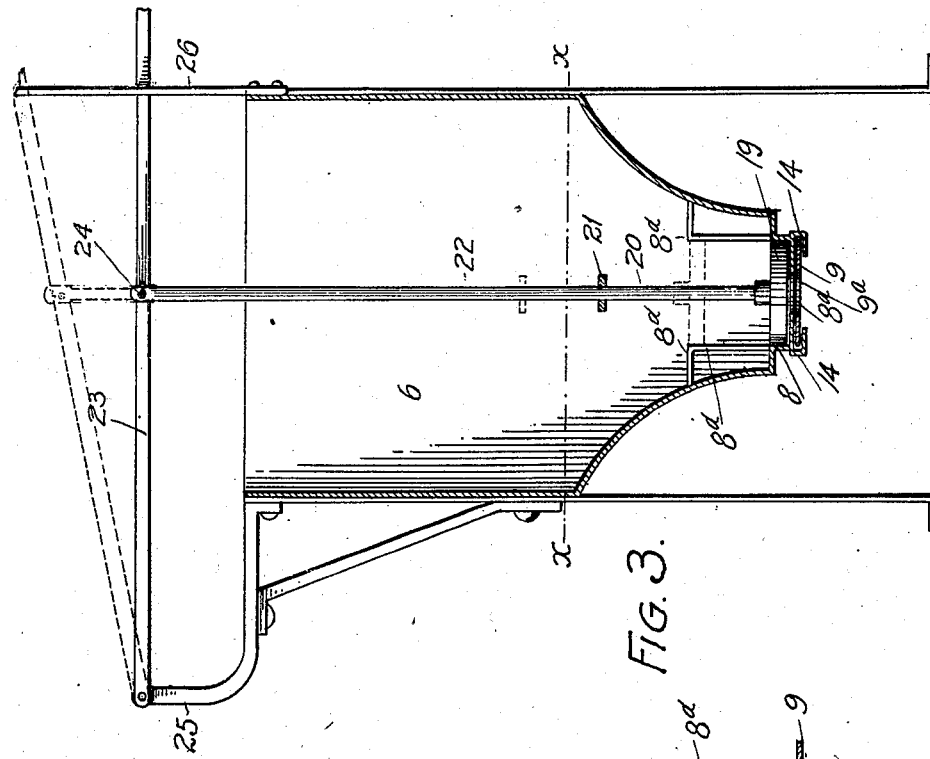
Figure 4:
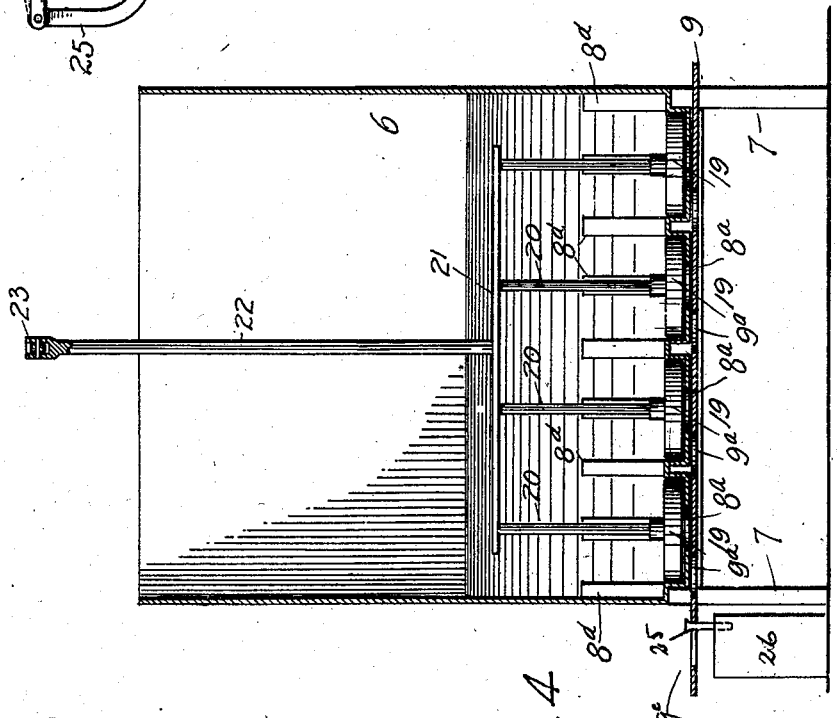

In the drawings, Figure 1 is a perspective view of my improved apparatus. Fig. 2 is a section taken through the tank or dough-receptacle on the line $x\ x$, Fig. 3. Fig. 3 is a vertical cross-section taken through the tank. Fig. 4 is a vertical longitudinal section of the same.

The same reference characters indicate the same parts in all the views.

Let the numeral 5 designate a suitable table or stationary support, which, as shown in the drawings, is provided with legs of suitable length to raise the tank to a convenient height for the operator. Upon this table or platform is mounted and secured in any suitable manner a tank or receptacle 6, which, as shown in the drawings, is mounted on legs 7, attached to the tank at the corners and extending to the top, their lower extremities being bent to form feet $7^a$, through which are passed suitable fastening devices. These legs raise the bottom of the tank sufficiently above the table to allow pans (not shown) to be passed underneath the apparatus either by hand or by means of an endless traveling carrier (not shown) which may be employed, if desired. It is evident that this tank may be of any suitable size. As shown in the drawings, the bottom of the tank, which is reduced, is provided with a number of cylindrical cells or chambers 8, each being of suitable capacity to hold the quantity of dough required for a single cake. Though four cells are shown in the drawings, it is evident that a greater or less number may be employed without departing from the spirit of the invention. In the bottom of each cell is formed an opening $8^a$, and a little below these openings is located a cut-off slide 9, having openings $9^a$, preferably of the same size as the openings $8^a$ and adapted when the slide is suitably actuated, as hereinafter explained, to register with the openings $8^a$ to allow the dough to pass from the cells 8 into the bake-pan below. The openings of the slide, however, normally do not register with the openings in the cells, the latter being closed at the bottom until the operator actuates the slide preparatory to ejecting the dough from the cells. To one extremity of this slide is attached a cord, chain, or other flexible device 10, which passes over a pulley 12, a weight 13 being attached to its lower extremity. Instead of a cord and weight a spring or other equivalent or other suitable device may be employed. This weight is of sufficient gravity to hold the slide normally at its limit of movement in one direction, whereby the openings in the slide do not register with the openings in the bottom of the tank communicating with the dough-cells. The cut-off slide 9 is supported by angle-pieces 14, applied to the bottom of the tank and forming ways for the slide. To the end of the slide remote from that to which the weight is connected is attached a cord, wire, chain, or other suitable flexible device 15, which passes over a pulley 16, mounted on the table, and thence downwardly to a foot-treadle 17, fulcrumed at 18. While, as shown in the drawings, the foot-treadle forms the means for applying the power to operate the cut-off slide, it is evident that any other suitable or desirable power may be employed.

Projecting upwardly from each cell 8 are a number of vertical pieces 8ᵈ, forming guides for plungers 19, adapted to enter the cells 8. Each plunger is provided with a stem 20. As shown in the drawings, the stems of the four plungers are all rigidly attached to a horizontal bar 21, to the center of which is secured an operating-rod 22, to the upper extremity of which is pivotally connected a lever 23, as shown at 24. This lever is fulcrumed on a bracket 25, secured to one side of the tank, while it passes through a slotted guide 26, secured to the opposite side of the tank.

When the apparatus is in use, a suitable quantity of dough of the proper consistency is placed in the tank. Assuming that the cake-pan is placed underneath, it is only necessary to lift the lever 23, which raises all the plungers 19 to the position above the cells 8, allowing the latter to fill with dough in the tank. The lever is moved downwardly, imparting a corresponding movement to the plungers. As soon as the plungers enter the cells the foot-lever 17 is pressed by the operator to bring the slide 9 into position, causing its openings 9ᵃ to register with the openings 8ᵃ of the cells. Then as the plungers continue their downward movement the quantity of dough contained in each cell is forced out through the registering openings into the pan. The foot-lever is then released, and the cut-off slide is returned through the instrumentality of the weight 13 to its normal position, whereby its openings are out of line with the openings in the bottom of the tank-cells. In the same manner the dough in the cells may be ejected as fast as the lever 23 can be raised and lowered and the slide 9 actuated.

It is evident that the plunger might be operated from a constantly-rotating crank-shaft and that automatic mechanism might be employed for operating the slide at regularly-timed or predetermined intervals.

To limit the movement of the cut-off slide 9 in both directions and to cause said slide to stop when its openings 9ᵃ exactly register or coincide with the slot-openings 8ᵃ in the bottom of the cells, I employ a stationary stop consisting of a projection 25, which passes through a slot 9ᶜ, formed in one end of the slide. The part 25 is made fast to a block 26, located beneath the slide and supported on the platform or table.

Having thus described my invention, what I claim is—

1. In a cup-cake-dropping apparatus, the combination with a suitable tank having shallow cells in its bottom, the said cells having bottom openings while their side walls are closed, the tank being provided with vertical guides extending above the cells and arranged to allow the dough to enter the cells between the guides, a cut-off slide normally held in position to close the openings of the cells, but having openings so arranged that when the slide is actuated, its openings are made to register with the openings in the bottom of the cells, and plungers movable vertically in the guides and adapted to enter the cells to eject their contents.

2. In a device of the class described, the combination with a suitable tank having shallow cells in its bottom, the said cells having bottom openings while their side walls are closed, the tank being provided with vertical guides extending above the cells and separated to allow the dough to pass from the bottom of the tank to the cells, a cut-off slide normally held in position to close the openings of the cells, the said slide having openings arranged to register with the openings in the cells when the slide is actuated, plungers movable vertically in the guides and adapted to enter the cells to eject their contents, stems with which the plungers are connected, means for connecting the plunger-stems, and means for simultaneously operating the series of plungers.

3. The combination with a suitable tank having sloping sides and shallow cells in its bottom, the said cells having bottom openings while their side walls are closed, the tank being provided with vertical guides extending above said openings and separated to allow the dough to enter the cells when the plungers are raised, a cut-off slide normally held in position to close the openings of the cells, means for operating said slide, means for limiting the movement of the slide in both directions, the said slide having openings arranged to register with the openings in the bottom of the cells when the slide is properly actuated, plungers movable vertically in the guides and adapted to enter the cells to eject their contents, and suitable means for simultaneously operating the plungers.

4. In a cup-cake-dropping apparatus, the combination with a suitable tank having shallow cells in its bottom, the said cells having bottom openings, the tank being provided with vertical guides extending above said openings and separated to allow the dough to pass between them into the cells when the plungers are raised, a cut-off slide normally held in position to close the openings of the cells, means for operating said slide which is slotted at one extremity, and a stationary device protruding through said slot in the slide whereby the movement of the slide is properly limited in both directions, the said slide having openings arranged to register with the openings in the bottom of the cells when the slide is actuated, plungers movable vertically in the guides and adapted to enter the cells to eject their contents, and suitable means for simultaneously operating the plungers.

In testimony whereof I affix my signature in presence of two witnesses.

WILLIAM J. MEIKLEHAM.

Witnesses:
DORA C. SHICK,
A. J. O'BRIEN.